(12) United States Patent
Ott et al.

(10) Patent No.: US 10,554,624 B2
(45) Date of Patent: Feb. 4, 2020

(54) PROXY AUTHENTICATION FOR SINGLE SIGN-ON

(71) Applicant: McAfee, LLC, Santa Clara, CA (US)

(72) Inventors: Alexey Ott, Paderborn (DE); Ulrich Homann, Paderborn (DE); Jan F. Schnellbaecher, Paderborn (DE)

(73) Assignee: McAfee, LLC, Santa Clara, CA (US)

( * ) Notice: Subject to any disclaimer, the term of this patent is extended or adjusted under 35 U.S.C. 154(b) by 143 days.

(21) Appl. No.: 14/912,453

(22) PCT Filed: Sep. 25, 2014

(86) PCT No.: PCT/US2014/057550
§ 371 (c)(1),
(2) Date: Feb. 17, 2016

(87) PCT Pub. No.: WO2015/048349
PCT Pub. Date: Apr. 2, 2015

(65) Prior Publication Data
US 2016/0205089 A1    Jul. 14, 2016

Related U.S. Application Data

(60) Provisional application No. 61/882,460, filed on Sep. 25, 2013.

(51) Int. Cl.
*H04L 29/06* (2006.01)
*H04L 9/32* (2006.01)

(52) U.S. Cl.
CPC .......... *H04L 63/0281* (2013.01); *H04L 9/32* (2013.01); *H04L 63/083* (2013.01);
(Continued)

(58) Field of Classification Search
CPC .............. H04L 63/0281; H04L 63/083; H04L 63/0815; H04L 63/0861; H04L 9/32; H04L 63/18
See application file for complete search history.

(56) References Cited

U.S. PATENT DOCUMENTS 5,974,566 A * 10/1999 Ault ................... H04L 63/10
709/225
5,987,610 A    11/1999 Franczek et al.
(Continued)

FOREIGN PATENT DOCUMENTS

WO    WO 2015/048349 A1    4/2015

OTHER PUBLICATIONS

Hunt, Duane, and Wasim A. Al-Hamdani. "Theoretical Analysis of using Identity Based PKI as the Authentication method in SQL." Proceedings of the 2013 on InfoSecCD'13: Information Security Curriculum Development Conference. (p. 33). ACM, 2013. (Year: 2013).*

(Continued)

*Primary Examiner* — Kari L Schmidt
(74) *Attorney, Agent, or Firm* — Patent Capital Group

(57) ABSTRACT

In an example, a web gateway is described, including an authentication proxy engine (PAE). The PAE authenticates a user device via, for example, a username and password, biometric data, or two-factor authentication. The web gateway then provides seamless and transparent single sign-on (SSO) for one or more web services. When the user requests a web page from the web service, the PAE inserts custom code that detects a login action. When the user logs in, a one-time token may be provided to auto-fill the username and password field. When the user submits the form, the PAE provides the actual credentials to the web service. The PAE may also provide authentication via authentication headers.

25 Claims, 5 Drawing Sheets

(52) U.S. Cl.
CPC ...... *H04L 63/0815* (2013.01); *H04L 63/0861* (2013.01); *H04L 63/18* (2013.01)

(56) References Cited

U.S. PATENT DOCUMENTS

| | | | |
|---|---|---|---|
| 6,073,142 A | 6/2000 | Geiger et al. | |
| 6,460,050 B1 | 10/2002 | Pace et al. | |
| 7,191,467 B1* | 3/2007 | Dujari | H04L 63/08 709/220 |
| 7,506,155 B1 | 3/2009 | Stewart et al. | |
| 7,698,735 B2* | 4/2010 | Dujari | H04L 63/08 380/248 |
| 8,549,300 B1* | 10/2013 | Kumar | H04L 9/3247 713/153 |
| 8,881,248 B2* | 11/2014 | Liu | H04L 63/0815 726/5 |
| 9,639,619 B2* | 5/2017 | Yao | G06F 17/30873 |
| 9,948,648 B1* | 4/2018 | King-Britton | H04L 63/10 |
| 2002/0023108 A1 | 2/2002 | Daswani | G06F 17/243 715/224 |
| 2005/0091539 A1* | 4/2005 | Wang | G06F 21/31 726/4 |
| 2007/0006291 A1* | 1/2007 | Barari | G06F 21/335 726/10 |
| 2008/0028206 A1* | 1/2008 | Sicard | H04L 63/0407 713/156 |
| 2008/0077809 A1* | 3/2008 | Hayler | G06F 12/1466 713/193 |
| 2009/0126000 A1 | 5/2009 | Andreev et al. | |
| 2010/0064234 A1* | 3/2010 | Schreiber | G06Q 30/0273 715/760 |
| 2011/0283347 A1 | 11/2011 | Bhuta et al. | |
| 2012/0167193 A1* | 6/2012 | Gargaro | G06F 21/41 726/8 |
| 2012/0278487 A1 | 11/2012 | Woelfel | |
| 2012/0284786 A1 | 11/2012 | Somani et al. | |
| 2013/0024925 A1* | 1/2013 | Venkataramani | H04L 63/083 726/7 |
| 2013/0173815 A1 | 7/2013 | Canning et al. | |
| 2017/0111383 A1* | 4/2017 | Most | H04L 63/08 |
| 2019/0097835 A1* | 3/2019 | Bhat | G06F 21/41 |

OTHER PUBLICATIONS

J. L. C. Gardenghi and M. A. G. Bardi, "An Authentication Middleware for Squid Proxy-Cache: A Single Sign-on Approach," 2012 12th International Conference on Computational Science and Its Applications, Salvador, 2012, pp. 138-141. (Year: 2012).*

S. K. Bhosale, "Architecture of a single sign on (SSO) for internet banking," 2008 IET International Conference on Wireless, Mobile and Multimedia Networks, Beijing, 2008, pp. 103-105. (Year: 2008).*

International Search Report and Written Opinion in International Application No. PCT/US2014/057550, dated Dec. 24, 2014, 11 pages.

* cited by examiner

PROXY AUTHENTICATION FOR SINGLE SIGN-ON

CROSS-REFERENCE TO RELATED APPLICATIONS

This Application is a National Stage application under 35 U.S.C. 371 of International Application PCT/US14/57550 filed on Sep. 25, 2014 and entitled PROXY AUTHENTICATION FOR SINGLE SIGN-ON, which claims priority to U.S. Provisional Patent Application Ser. No. 61/882,460, filed on Sep. 25, 2013 and entitled SYSTEM AND METHOD FOR PROVIDING A PROXY. The disclosures of the prior applications are considered part of and are incorporated by reference in the disclosure of this application.

FIELD OF THE DISCLOSURE

This application relates to the field of computer security, and more particularly to a proxy-based single sign-on architecture.

BACKGROUND

Authentication is the process by which a first party verifies that a second party is who or what it claims to be. For example, in a computer security context, authentication may include a computer verifying that a user trying to access computing resources is who he claims to be, in this case a person authorized to access those resources. When the user then wants to use that computer to access resources on a server, such as a web service, he may again be required to authenticate himself to the web service. As the number of web services proliferates, the user may need to keep track of a growing list of security credentials for accessing each service. This issue can arise in both the personal computing context, where the user accesses web services for personal reasons, and in the enterprise, where the user may need to access a plurality of enterprise resources, each requiring credentials.

"Single sign-on" (SSO) solutions may be provided to help a user manage security credentials. These may take the form, for example, of a local password repository where a user stores a plurality of passwords, protected by a master password. In the enterprise context, SSO may include configuring client devices to connect to a network where a user's credentials may provide access to a plurality of resources and services.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
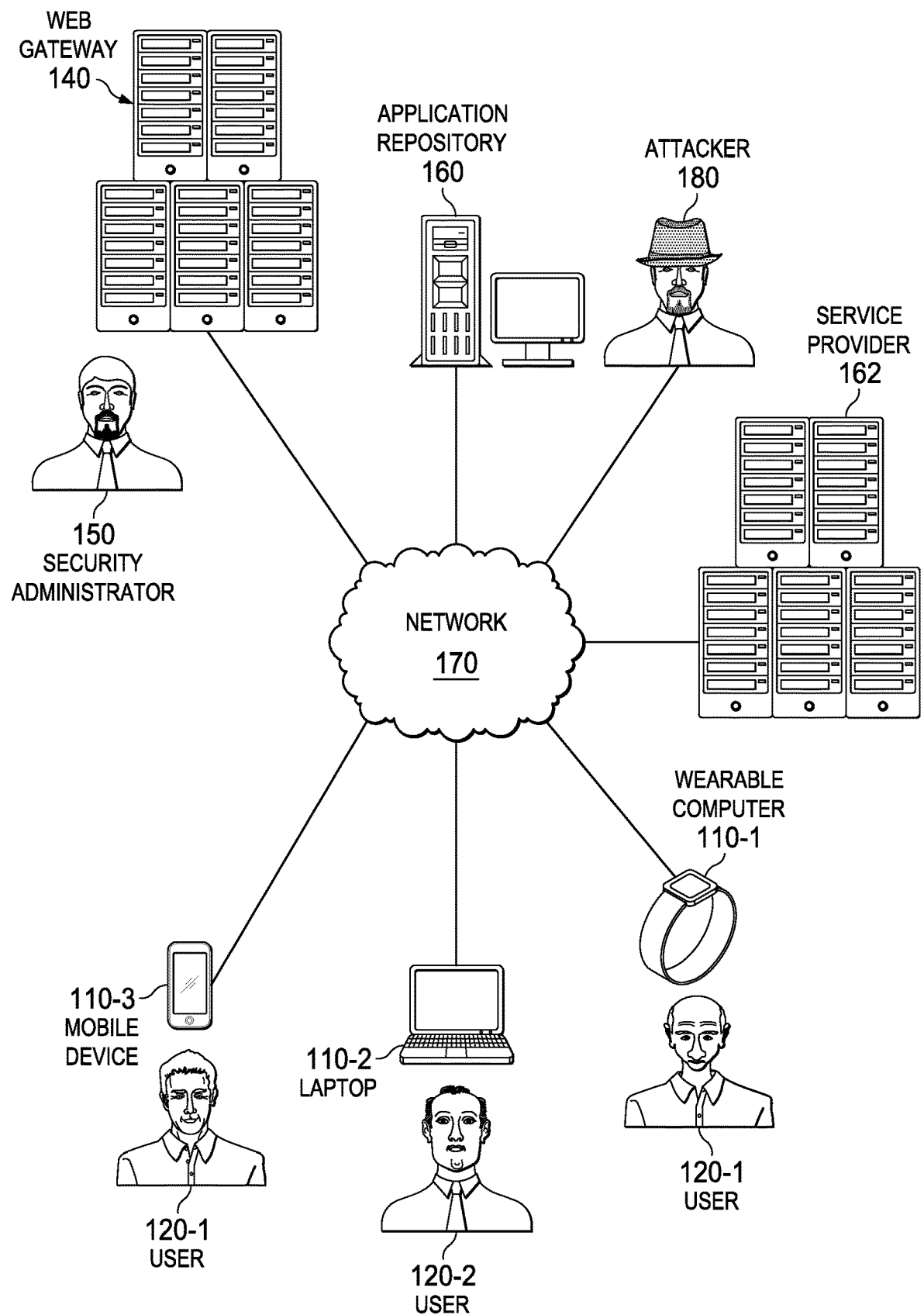
FIG. 1 is a block diagram of a security-enabled network according to one or more examples of the present Specification.

In an example, a web gateway is described, including an proxy authentication engine (PAE). The PAE authenticates a user device via, for example, a username and password, biometric data, or two-factor authentication. The web gateway then provides seamless and transparent single sign-on (SSO) for one or more web services. When the user requests a web page from the web service, the PAE inserts custom code that detects a login action. When the user logs in, a one-time token may be provided to auto-fill the username and password field. When the user submits the form, the PAE provides the actual credentials to the web service. The PAE may also provide authentication via authentication headers.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments may have different advantages, and no particular advantage is necessarily required of any embodiment.

In a controlled environment, such as a business or other enterprise, administrators may want to exercise full control over access to certain services that clients use. Many of these services may require authentication, such as form-based authentication with form fields to be filled with, for example, usernames and passwords, or web server authentication where no logical session exists but each request or connection will be authenticated with an authentication header, as in "Basic," Windows NT Local Area Network (LAN) Management (NTLM), X509 client certificates, and similar.

In form-based authentication, users may be authenticated by filling in a username and password in the appropriate fields in the form. In some cases, additional authentication may take the form of filling in a security code, "CAPTCHA," or two-factor authentication such as use of an RSA key, biometric authentication, or user of one-time codes. Issues to be aware of in such system may include the following:

a. Administrators may want to minimize risk. There may be some risk associated with the user himself "owning" the username and password, or storing the username and password on client-owned and controlled devices. For example, malware on the client system may compromise security, the user may forget the username and password, the user may lose his computer along with its data, or the user may be terminated, in which case it is desirable to immediately revoke access.
b. Administrators may want to be able to enforce a password policy (e.g., change after x days, change after y logins, revoke passwords based on definable criteria) without having to synchronize multiple credential stores.
c. Administrators may want seamless logins to these services. Advantageously, seamless login does not require the user to access a separate portal page (form-based authentication), and in some cases, without (visible) authentication. With some solutions, such as NTLM, this may in fact make a zero-sign-on solution.
d. Administrators may want to be able to configure group-based accounts. For example, access control may be configured on a group-by-group basis.
e. Administrators may want to combine the seamless login with complex policy decisions (e.g., time, geo location of the client, service reputation, two-factor authentication, Anti-Virus (AV) scanning, Data Loss Prevention (DLP), certificate verification, number of concurrent logins, by way of non-limiting example).
f. Administrators may want to combine single-sign-on (SSO) with on-the-fly data encryption and decryption for cloud storage services.
g. Administrators may want to hide the service Universal Resource Locator (URL) with URL rewrite techniques.
h. Administrators may want to use only one User Interface (UI) to configure and secure the system, instead of separately configuring each end-user device.
i. Administrators may want these functionalities even in cases where the service provider does not agree to collaborate or cooperate, or when it is not feasible to redesign legacy systems for SSO.
j. Administrators may want to be guided by the software to easily configure services that are not already pre-configured.

This disclosure provides a system and method for addressing at least some of the administrator needs described above. In one example, a web gateway with an authentication proxy engine (PAE) server is provided and disposed between client or end-user devices and one or more available web services. The web gateway may authenticate end users according to an established enterprise policy, including for example so-called "You are the Password" (YAP) services like biometric authentication provided by wearable computing devices. The web gateway then intercepts any page requests to service providers. If the service provider requires authentication, then in one example the user's credentials are "owned" by the web gateway rather than the user (in other words, the user need not ever see or know his credentials), and are provided to the service provider automatically whenever a user performs a login action. A one-time "token," which may include a pseudo-username and pseudo-password, may be provided to the user and/or auto-filled into appropriate web forms. This may avoid issues, for example, with web forms that will not permit a login action (such as clicking a "Login" button) to be completed without some input in required fields.

In another example, a learning mode is provided to gather parameters of services that are not already pre-configured or pre-defined.

The PAE of the web gateway may perform authentication steps on behalf of the user, such as submitting a username or password, or even handling two-factor authentication. In cases where a CAPTCHA is to be solved as part of the authentication process, the CAPTCHA may be forwarded to the user for input. The authentication methods include but are not limited to the basic authentication scheme and NT LAN Manager (NTLM).

The web gateway of the present Specification may include a web gateway platform such as a McAfee® Web Gateway Platform. It may also include, or there may be additionally provided, other components such as an HTTP and HTTPS proxy, a rule engine, a secure credential store, a user interface, and a single-sign-on (SSO) module.

Requests to web-based services may be routed through the web gateway platform. The web gateway platform may apply policy decisions (including user authentication) and scan the HTTP(S) requests and responses for supported services. All supported services may be stored in a service DB. Depending on the service's authentication schema (form based or web server authentication), authentication may comprise the following operations in one non-limiting example.

For form-based authentication:
a. The client device requests the page.
b. The web gateway intercepts the request.
c. The web gateway requests the page from the service provider and receives the page.
d. The PAE injects into the page a script or other code stored in a service DB (possibly adapted to the service or client).
e. The script monitors user activities and waits until it detects a login action, which may include any action or condition that indicates a desire or need for the end user to login to the service. The detection may be triggered, for example, by clicking on any managed input field or by hovering over a managed field.
f. The script may "gray out" input fields for the username, password, or similar, so that the user cannot manipulate the form.
g. If the web gateway does not have credentials for this user on this service, the script may allow the user to enter them into a separate page, or directly into the form. If more than one account exists, the script may prompt the user to select credentials for one of the account.
h. In some cases, the script receives a "token" from the PAE. The token may be a one-time pseudo-username and pseudo-password that can be used as a "form filler" to provide a useful input into mandatory data fields, either on the form or for internal purposes. Advantageously, the actual credentials need not be provided to the client device, so that they cannot be compromised by an infected client. The token and account data may have already been inserted by the PAE into the script, or the script may request them on demand, as necessary.
i. The communication channel between the script and the PAE can be used to report incompatibilities between the script and the service. In this case, the information may be sent to a security administrator for adjusting the data that will then be updated on a telemetry and update server and afterwards used by rolled-out web gateway installations.
j. The script submits the login action to the PAE on the web gateway.
k. If the credentials are new, the PAE may store them in the account DB, which may include a secure credential store. This anticipates an embodiment where the user is permitted to provide his own credentials, which will not be true in every case. If the credentials are not new, the PAE retrieves the existing credentials from the account DB.

l. Once the PAE receives the login action from the script, the PAE replaces the token with real credentials and forwards the login request to the service provider, after applying any necessary enterprise policies.

m. The service provider may provide an authentication confirmation, indicating that the user is now logged in. The PAE may forward this to the client device.

Web server-based authentication is similar to the above, with the exception that depending on the policy, the PAE may read the user's credentials from the account DB, insert them into the data flow, and repeat the request without client knowledge and interaction. This authenticates the client to the service provider. Alternatively a service-independent script may be inserted into a response packet to let the user decide if he wants to provide credentials, and if so, for which account.

Advantageously, one embodiment of the present disclosure may be particularly useful in lower-volume architectures, such as test systems and design/debug tools. In those cases, providing a specialized configuration for each product may be impractical.

Further advantageously, the present Specification provides a system and method that can operate independently of a redirect solution or a browser plugin. For example, certain embodiments of single assertion markup language (SAML)-based solutions require both the client and server to be specifically configured to operate within a SAML architecture, while a web gateway with a PAE server may be able to function, in some embodiments, with little or no reconfiguration of either the client or server. This enables the number of supported web services to be easily increased.

Further advantageously, the web gateway of the present Specification may be combined with client-side technologies such as wearable computing and "you-are-the-password" (YAP) and multi-factor authentication technologies to increase security, and in some cases to make authentication more seamless for end users. In some embodiments, such policies can be enforced at the web gateway, without needing to modify client devices other than providing client devices with the necessary capabilities.

FIG. 1 is a network-level diagram of a distributed security network 100 according to one or more examples of the present Specification. In the example of FIG. 1, a plurality of users 120 operate a plurality of computing devices 110. Specifically, user 120-1 operates wearable computer 110-1. This may be, for example, a wristwatch computer or other suitable wearable device. User 120-2 operates laptop computer 110-2. And user 120-3 operates mobile device 110-3.

Each computing device may include an appropriate operating system, such as Microsoft Windows, Linux, Android, Mac OSX, Apple iOS, Unix, or similar. Some of the foregoing may be more often used on one type of device than another.

Computing devices 110 may be communicatively coupled to one another and to other network resources via network 170. Network 170 may be any suitable network or combination of networks, including for example, a local area network, a wide area network, a wireless network, a cellular network, or the Internet by way of nonlimiting example. In this illustration, network 170 is shown as a single network for simplicity, but in some embodiments, network 170 may include a large number of networks, such as one or more enterprise intranets connected to the internet.

Also connected to network 170 are one or more web gateways 140, a service provider 162, an application repository 160, and human actors connecting through various devices, including for example an attacker 180. Web gateway 140 may be configured to act, among other things, as a proxy server for user devices 110 to access a service of service provider 162. In one embodiment, web gateway 140 and at least a part of network 170 are administered by one or more security administrators 150, which may be a person, persons, or enterprise that defines policies for web gateway 140 and which may also be configured to provide updates thereto.

It may be a goal of users 120, and of the enterprise, to successfully operate computing devices 110 without interference from attacker 180. In one example, attacker 180 is a malware author whose goal or purpose is to cause malicious harm or mischief. The malicious harm or mischief may take the form of installing root kits or other malware on computing devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more computing devices 110. As used throughout this Specification, malicious software ("malware") includes any virus, trojan, zombie, rootkit, backdoor, worm, spyware, adware, ransomware, dialer, payload, malicious browser helper object, cookie, logger, or similar designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation. Thus, it is desirable to authenticate users 120 to ensure that they are legitimate users, and not attackers 180. It may also be desirable to authenticate user devices 110, to ensure that they are not foreign to network 170, as a device operated by attacker 180 may be. In one example, one or more computing devices 110 are equipped with Intel® SGX or hardware enclave capabilities, allowing end user devices 110 to be securely and uniquely identified.

Web gateway 140 may be provided as a proxy to one or more user devices 110. In in that case, user devices 110 do not directly access network resources, such as application repository 160 and service provider 162. Rather, requests for data pages from service provider 162 are first routed through web gateway 140. As used throughout this specification and the appended claims, a "page" or "data page" includes any data packet or feed that a client device 110 may request from a service provider 162. Thus, it is not intended that a data page be restricted merely to an HTML webpage provided over HTTP. Rather, a data page may include an FTP or secure socket session, a database transaction, or launching a virtual machine instance, by way of nonlimiting example. In some cases, data pages may provide a login form, such as username and password fields. In other cases, data pages may be authenticated on a per-transaction basis via authentication headers. In either case, the provision of web gateway 140 as a proxy between end-user devices 110 and service provider 162 advantageously enables end-user devices 110 to access resources on service provider 162 with a single sign on. Further advantageously, end-user devices 110 need not receive any special configuration to enable this single sign-on. Rather, because web gateway 140 acts as a proxy, SSO services can be provided seamlessly and transparently to end-user devices 110.

Application repository 160 may represent a Windows or Apple "app store," a Unix-like repository or ports collection, or other network service providing users 120 the ability to interactively or automatically download and install applications on computing devices 110. Attacker 180 may provide software via application repository 160. If application repository 160 has security measures in place that make it difficult for attacker 180 to distribute overtly malicious software, attacker 180 may instead stealthily insert vulnerabilities into apparently-beneficial applications.

In some cases, one or more users 120 may belong to an enterprise. The enterprise may provide policy directives that restrict the types of applications that can be installed, for example from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions, and web gateway 140 may enforce policies via a policy layer.

In another example, user 120 may be a parent of young children, and wish to protect the children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

Collectively, any object that is a candidate for being one of the foregoing types of content may be referred to as "potentially unwanted content" (PUC). The "potentially" aspect of PUC means that when the object is marked as PUC, it is not necessarily blacklisted. Rather, it is a candidate for being an object that should not be allowed to reside or work on a computing device 110. Thus, it is a goal of users 120 and security administrator 150 to configure and operate computing devices 110 so as to usefully analyze PUC and make intelligent decisions about how to respond to a PUC object, and how to respond to attempts by attacker 180 to gain access to system resources.

Figure 2:
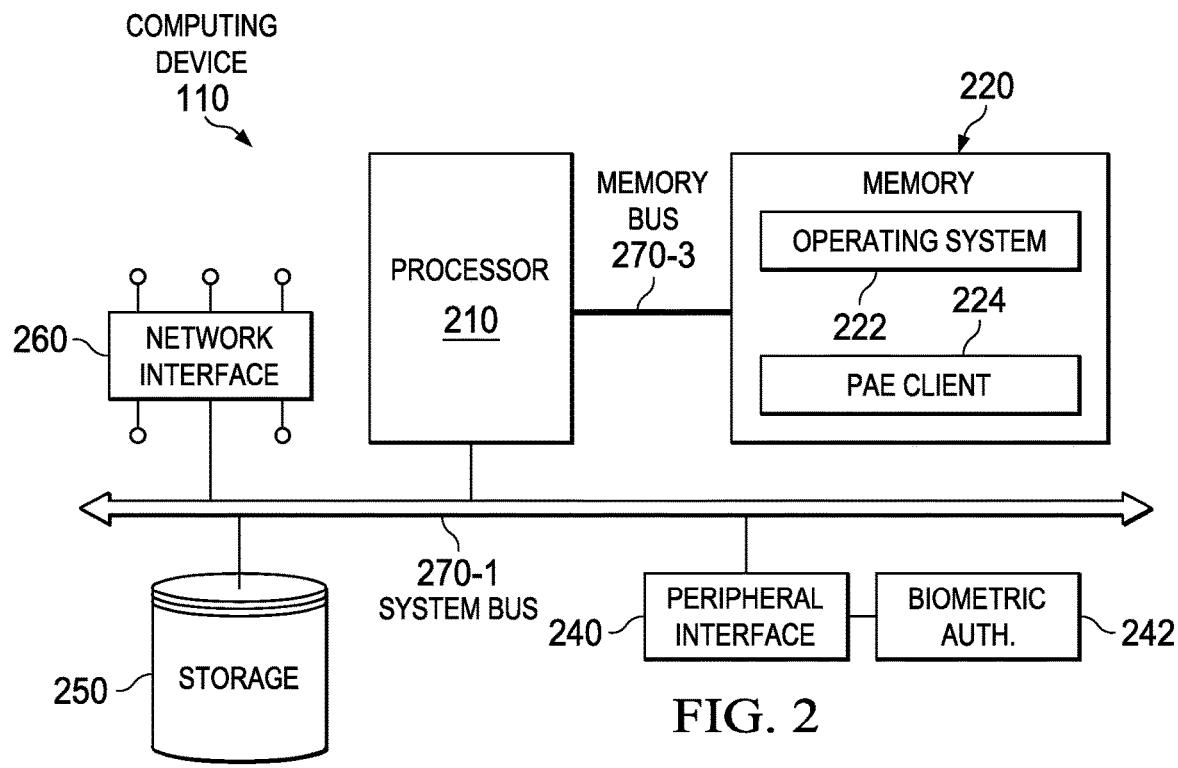
FIG. 2 is a block diagram of a computing device according to one or more examples of the present Specification.

FIG. 2 is a block diagram of client device 110 according to one or more examples of the present Specification. Client device 110 may be any suitable computing device. In various embodiments, a "computing device" may be or comprise, by way of non-limiting example, a computer, embedded computer, embedded controller, embedded sensor, personal digital assistant (PDA), laptop computer, cellular telephone, IP telephone, smart phone, tablet computer, convertible tablet computer, handheld calculator, or any other electronic, microelectronic, or microelectromechanical device for processing and communicating data Client device 110 includes a processor 210 connected to a memory 220, having stored therein executable instructions for providing an operating system 222 and PAE client 224. Other components of client device 110 include a storage 250, network interface 260, and peripheral interface 240.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of hardware, software, or firmware providing programmable logic, including by way of non-limiting example a microprocessor, digital signal processor, field-programmable gate array, programmable logic array, application-specific integrated circuit, or virtual machine processor.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tPAE memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 250 may be any species of memory 220, or may be a separate device, such as a hard drive, solid-state drive, external storage, redundant array of independent disks (RAID), network-attached storage, optical storage, tPAE drive, backup system, cloud storage, or any combination of the foregoing. Storage 250 may be, or may include therein, a database or databases or data stored in other configurations, and may include a stored copy of operational software such as operating system 222 and software portions of PAE client 224. Many other configurations are also possible, and are intended to be encompassed within the broad scope of this Specification.

Network interface 260 may be provided to communicatively couple client device 110 to a wired or wireless network. A "network," as used throughout this Specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

PAE client 224, in one example, is a utility or program that provides specialized PAE services as described herein. As discussed above, in some embodiments, some or all computing devices 110 may be capable of functioning without a special PAE client 224. Where it is provided, PAE client 224 may be, in various embodiments, embodied in hardware, software, firmware, or some combination thereof. For example, in some cases, PAE client 224 may include a special integrated circuit designed to carry out a method or a part thereof, and may also include software instructions operable to instruct a processor to perform the method. In some cases, PAE client 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. It should also be noted that PAE client 224 is provided by way of non-limiting example only, and that other hardware and software, including interactive or user-mode software, may also be provided in conjunction with, in addition to, or instead of PAE client 224 to perform methods according to this Specification.

In one example, PAE client 224 includes executable instructions stored on a non-transitory medium operable to perform PAE client methods, or a similar method according to this Specification. At an appropriate time, such as upon booting client device 110 or upon a command from operating system 222 or a user 120, processor 210 may retrieve a copy of PAE client 224 (or software portions thereof) from storage 250 and load it into memory 220. Processor 210 may then iteratively execute the instructions of PAE client 224.

Peripheral interface 240 may be configured to interface with any auxiliary device that connects to client device 110 but that is not necessarily a part of the core architecture of client device 110. A peripheral may be operable to provide extended functionality to client device 110, and may or may not be wholly dependent on client device 110. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

A plurality of peripheral devices may be connected to peripheral interface 240. These may include, in one example, YAP authentication mechanisms, such as a biometric authenticator 242. Biometric authenticator 242 may include, for example, a fingerprint reader, a retinal scan, a voice print, or other similar biometric authentication devices. This may enable a user 120 to authenticate himself to computing device 110 in a relatively secure fashion and with minimal effort. Robust biometric authentication mechanisms are difficult to spoof, but easy for the authentic user to provide. Thus, an end-user 120 may gain access to SSO services in one embodiment simply by providing his fingerprint or other biometric authentication to biometric authenticator 242. Once biometric authenticator 242 has determined that the user is who he claims to be, he may then be granted access to broader system resources on network 170.

In some cases, PAE client 224 may be provided to facilitate communication with gateway 140. However, advantageously, a PAE client 224 need not be provided in all cases. In many cases, it is sufficient for computing device 110 to access resources via web gateway 140 acting as a proxy. Thus, in some cases, the only provisioning necessary on computing device 110 is designating web gateway 140 as a proxy server for the device.

Figure 3:
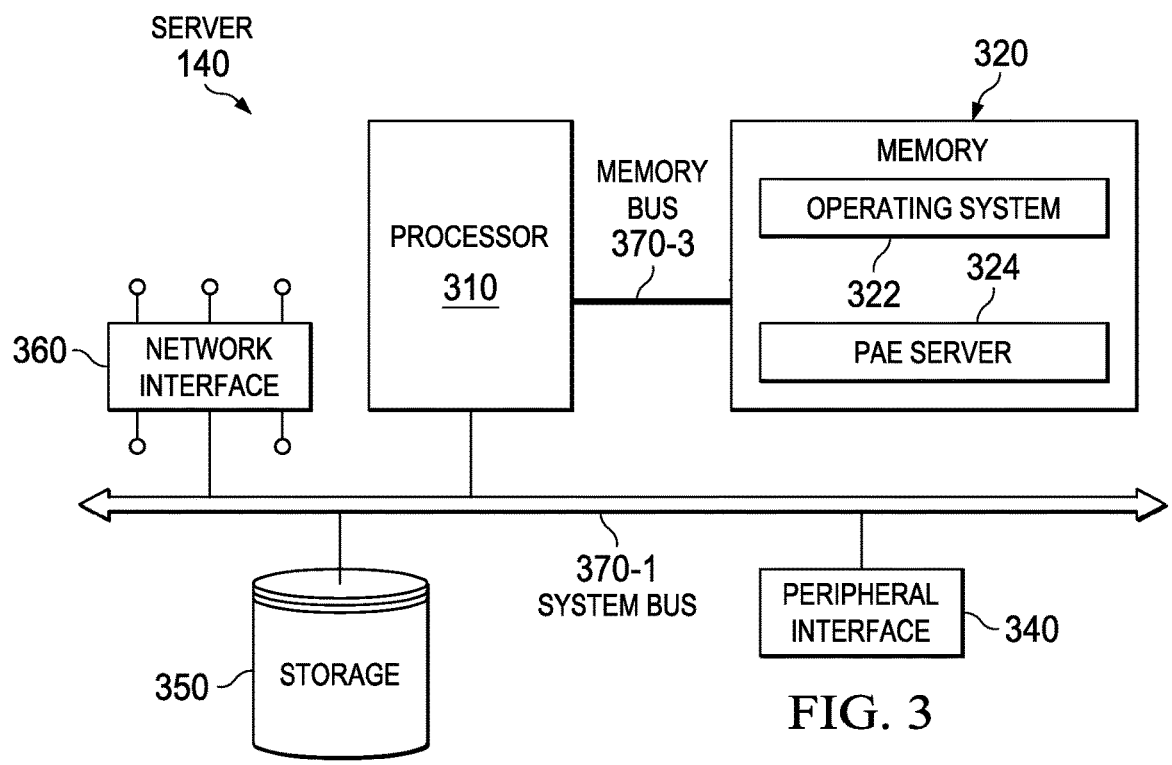
FIG. 3 is a block diagram of a server according to one or more examples of the present Specification.

FIG. 3 is a block diagram of server 140 according to one or more examples of the present Specification. Server 140 may be any suitable computing device, as described in connection with FIG. 2. In general, the definitions and examples of FIG. 2 may be considered as equally applicable to FIG. 3, unless specifically stated otherwise.

Server 140 includes a processor 310 connected to a memory 320, having stored therein executable instructions for providing an operating system 322 and PAE server 324. Other components of server 140 include a storage 350, network interface 360, and peripheral interface 340.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3. To simplify this disclosure, memory 320 is disclosed as a single logical block, but in a physical embodiment may include one or more blocks of any suitable volatile or non-volatile memory technology or technologies, as described in connection with memory 220 of FIG. 2. In certain embodiments, memory 320 may comprise a relatively low-latency volatile main memory, while storage 350 may comprise a relatively higher-latency non-volatile memory. However, memory 320 and storage 350 need not be physically separate devices, as further described in connection with FIG. 2

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of PAE server 324. Many other configurations are also possible, and are intended to be encompassed within the broad scope of this Specification.

Network interface 360 may be provided to communicatively couple server 140 to a wired or wireless network.

PAE server 324, in one example, is a utility or program that carries out methods according to this Specification. PAE server 324 may be, in various embodiments, embodied in hardware, software, firmware, or some combination thereof. For example, in some cases, PAE server 324 may include a special integrated circuit designed to carry out a method or a part thereof, and may also include software instructions operable to instruct a processor to perform the method. In some cases, PAE server 324 may run as a daemon process, as described above. It should also be noted that PAE server 324 is provided by way of non-limiting example only, and that other hardware and software, including interactive or user-mode software, may also be provided in conjunction with, in addition to, or instead of PAE server 324 to perform methods according to this Specification.

In one example, PAE server 324 includes executable instructions stored on a non-transitory medium operable to perform methods according to this Specification. At an appropriate time, such as upon booting server 140 or upon a command from operating system 322 or a user 120, processor 310 may retrieve a copy of PAE server 324 (or software portions thereof) from storage 350 and load it into memory 320. Processor 310 may then iteratively execute the instructions of PAE server 324.

More generally, one or more logic elements comprise a PAE server 324. PAE server 324 is shown in this example as a program running in memory 320. However, the PAE should be understood more broadly to encompass one or more logic elements comprising all necessary hardware, software, and/or firmware for carrying out the methods described herein in connection with the PAE. In some cases, certain functions of authentication proxy engine 324 may be split across multiple computing devices.

Peripheral interface 340 may be configured to interface with any auxiliary device that connects to server 140 but that is not necessarily a part of the core architecture of server 140. A peripheral may be operable to provide extended functionality to server 140, and may or may not be wholly dependent on server 140. In some cases, a peripheral may be a computing device in its own right. Peripherals may include, by way of non-limiting examples, any of the devices discussed in connection with peripheral interface 240 of FIG. 2.

Figure 4:
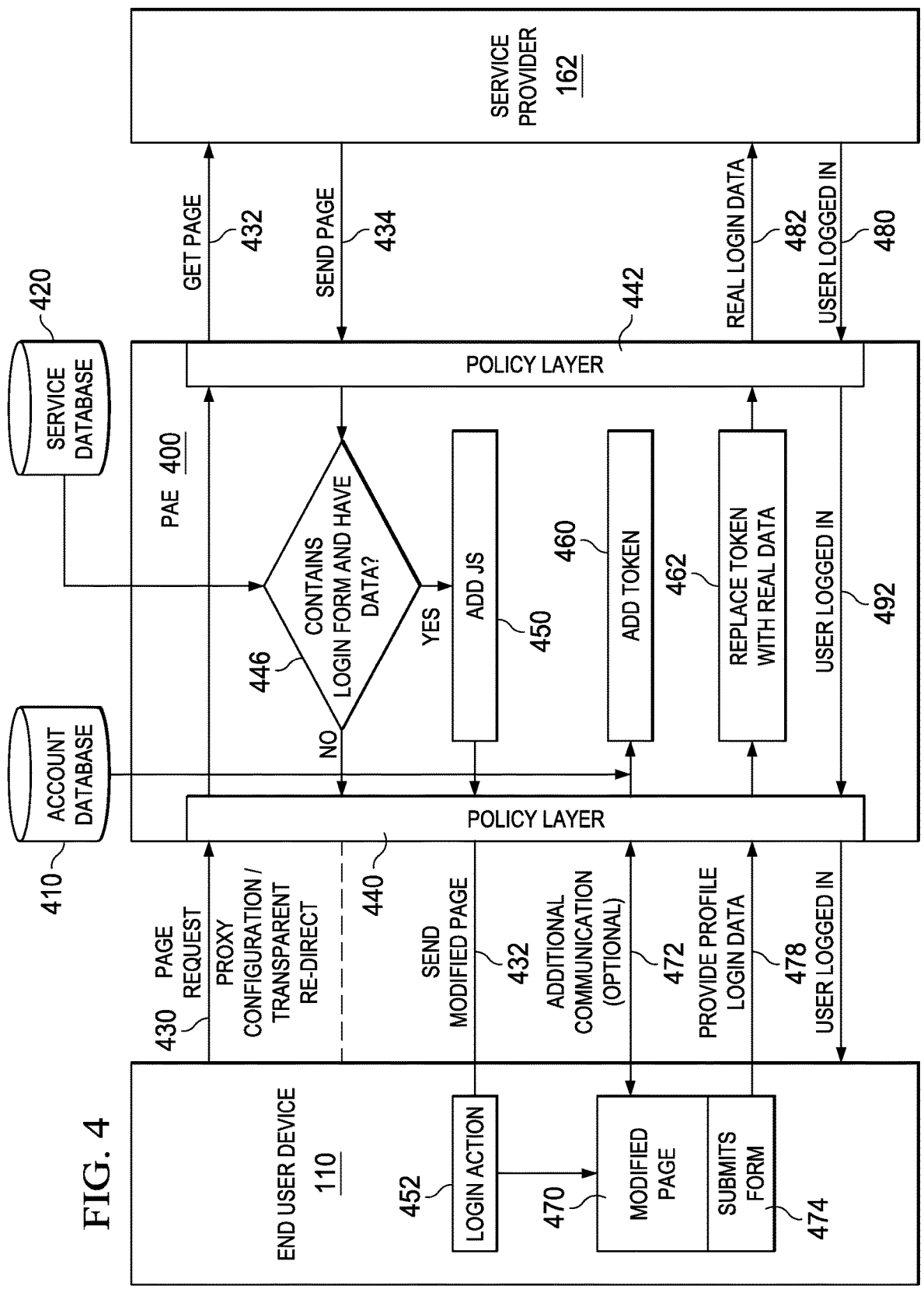
FIG. 4 is a functional block diagram of a proxy authentication engine according to one or more examples of the present Specification.

FIG. 4 is a functional block diagram of a PAE 400 performing form-based authentication according to one or more examples of the present Specification.

In the example of FIG. 4, PAE 400 is configured to apply a policy layer 440 to client-side traffic, and a policy layer 442 to server-side traffic. Policies 440 and 442 may include enterprise compliance rules, firewall rules, traffic shaping rules, or other policies to conform traffic to system requirements.

An account database 410 and a service database 420 may be provided. Account database 410 may include login credentials for one or more users who wish to access one or more services provided by one or more service providers 162. Credentials may include, by way of nonlimiting example, user names, passwords, encryption keys, and certificates. Account database 410 may also include data for authenticating a user 120, such as biometric data, certificates, usernames, and hashes of passwords.

Service database 420 may include data for interfacing with service provider 162, such as JavaScript or other executable code for modifying pages received from service provider 162 to interoperate with PAE 400.

Service provider 162 may provide services that are personal in nature, such as social media and networking services, or enterprise services. Service provider 162 may require authentication for one or more users.

In one example, a user 120 operating end-user device 110 sends a page request 430 directed to service provider 162. However, page request 430 does not go directly to service provider 162, because gateway 140 is interposed as a proxy between end-user device 110 and service provider 162.

Thus, when user 120 uses end-user device 110 to send a page request to service provider 162, gateway 140 receives page request 430. Gateway 140 then forwards a page request 432 to service provider 162. In one example, page request 432 is substantially identical to page request 430, but includes different routing information.

Responsive to page request 432, service provider 162 may send page 434.

At block 440, PAE 400 applies policy layer 440 to the data page sent in 434.

In block 446, PAE 400 determines whether the data page contains a login form. If no login form is provided, then gateway 140 need take no further action on the requested data page.

If the page contains a login form, then gateway 140 may modify the data page according to the teachings of this Specification.

In block 450, PAE 400 modifies the page, for example by inserting executable code to handle the authentication. In certain embodiments, PAE 400 may also insert a token at this point. The token may be random or pseudorandom, and may replace, for example, a username and password input field. This is particularly useful because many web forms will not allow a user to submit a login form without first verifying that something has been entered into those fields.

In block 462, PAE 400 may also add one or more tokens to the page. The token may be a random or pseudo-random string, a fixed string, or a string generated according to a determinate algorithm.

In block 452, the executable code detects a login action. This may include, for example, the user clicking a "LOGIN" button, hovering over a login field, or clicking on a login field.

In block 472, additional communication between end user device 110 and PAE 400 may occur, as necessary.

In block 474, user 120 completes the login action on modified page 470. In block 478, the script provides profile login data to PAE 400. This may include authenticating user 120 or end user device 110 to PAE 400 and/or web gateway 140. However, in other embodiments, authentication may take place in a separate transaction. Authentication may include YAP methods.

In block 462, PAE 400 replaces the token of block 460 with the real credentials, which may be retrieved from account database 410 if they are available. As described above, in some cases where credentials are not yet available in account database 410, user 120 may provide credentials, such as in block 478.

In block 482, PAE 400 provides the real login credentials to service provider 162.

In block 480, service provider 162 provides to PAE 400 a notification that user 120 is now authenticated and logged in to service provider 162.

In block 492, PAE 400 may forward this notification to policy layer 440, and PAE 400 may also inform end user device 110 that user 120 is now authenticated and logged in.

Figure 5:
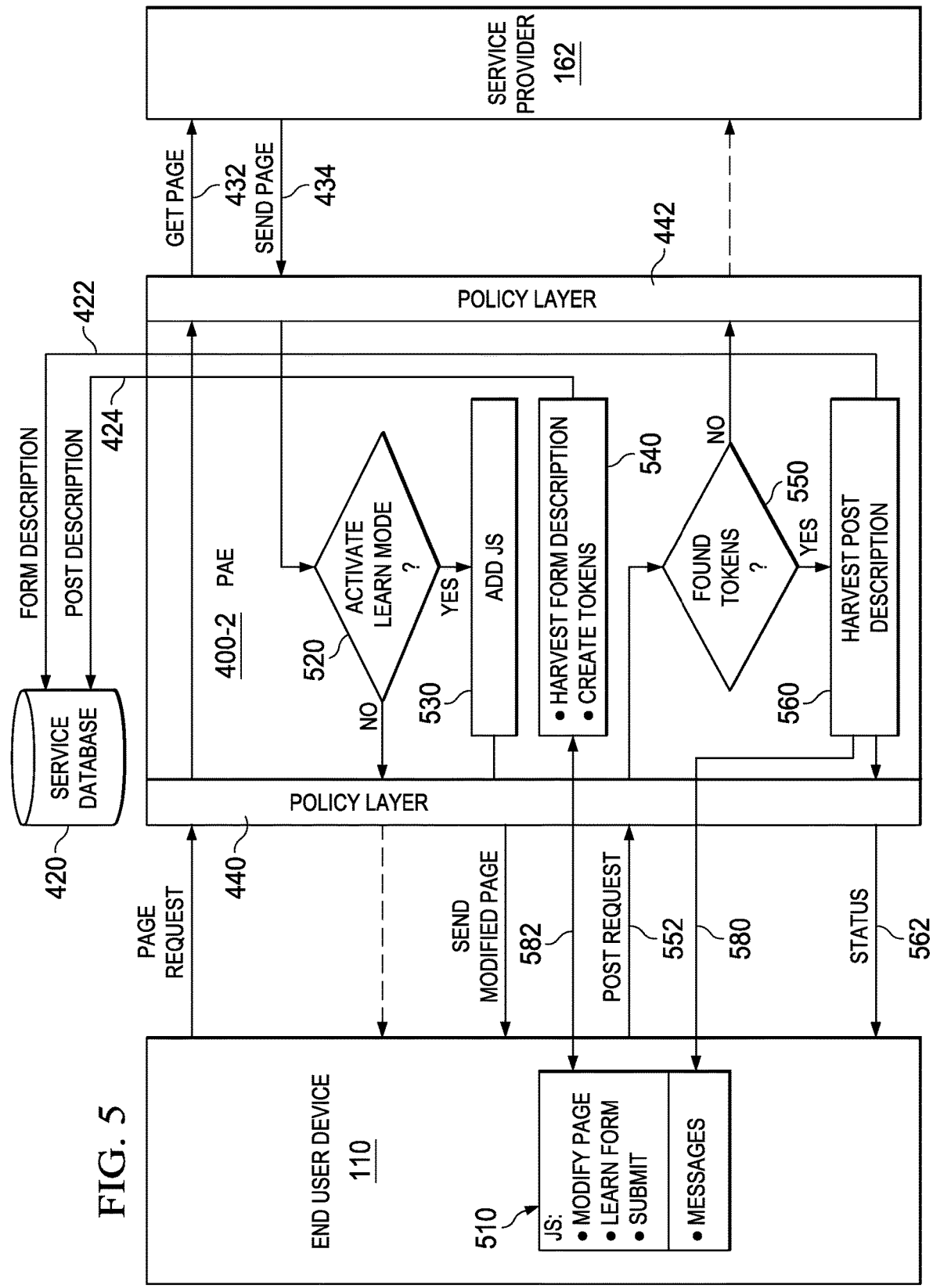
FIG. 5 is a functional block diagram of a proxy authentication engine according to one or more examples of the present Specification.

FIG. 5 is a functional block diagram of a PAE 400-2 in a learning mode according to one or more examples of the present Specification.

In this example, a semi-automated gathering of form-based data is used to build a service connector that may be provided for the single-sign-on operation described above. PAE 400-2 makes policy decisions and determines if a script to support the semi-automated gathering should be injected into the page. This script code monitors user activities (e.g., clicking on any input field) and creates, based on these and direct user input, the specification of a login form on the page. The gathered specification may be provided to PAE 400-2 using the same channel described above in relation to the single-sign-on operation.

In return, PAE 400-2 sends a set of test tokens to the script. The script may insert the test tokens and triggers itself or advise the user to submit the form. PAE 400 detects the test tokens in a login request and verifies the gathered specification. The form specification and the login request specification describe the service and are transferred to the service DB. A suitable status code may be sent back.

In FIG. 5, service database 420 includes a form description 422 and post description 424.

As with the example of FIG. 4, end-user device 110 sends a page request 430 to service provider 162. Web gateway 140 intercepts the page request, and sends a page request 432 to service provider 162. Service provider 162 then sends page 434 to the web Gateway 140, including PAE 400-2.

In block 520, PAE 400-2 determines whether to activate learning mode. If learning mode is not be activated, then PAE 400-2 needs not take any additional action.

If learning mode is activated, then in block 530, PAE 400-2 may add appropriate code such as JavaScript, as described in connection with FIG. 4. PAE 400-2 then sends the modified page to end-user device 110.

In block 540, PAE 400-2 harvests form descriptions and creates tokens. This may interactively communicate with JavaScript of block 510 on end-user device 110. The JavaScript of block 510 may be configured to modify the page, learn the form, submit the form, and handle messaging.

In block 552, end-user device 110 sends a post request signal 552.

In block 550, PAE 400-2 determines whether any tokens were found. If no tokens are found, then PAE 400-2 need not take any additional action.

In block 560, if tokens were found, then in block 580, PAE 400-2 may provide the descriptions to end-user device 110 as messages.

In block 562, PAE 400-2 also provides a status update.

Figure 6:
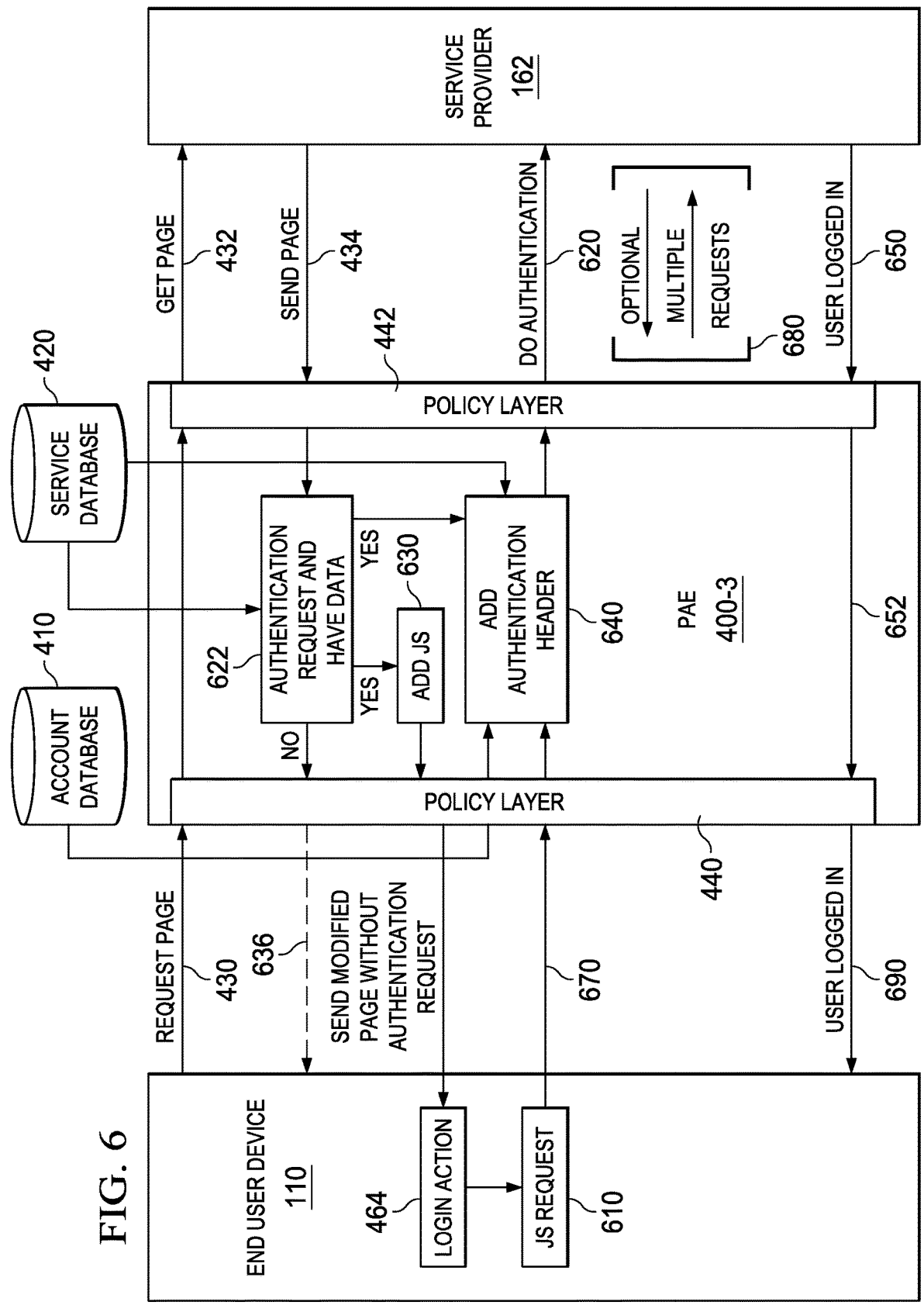
FIG. 6 is a functional block diagram of a proxy authentication engine according to one or more examples of the present Specification.

FIG. 6 is a functional block diagram of a PAE 400-3 performing web server-based authentication according to one or more examples of the present specification. In many respects, the method of FIG. 6 is similar to the method of FIG. 4.

In block 430, end-user device 110 sends a page request to service provider 162. As before, web gateway 140 intercepts the message.

In block 432, web gateway 140 sends a page request to service provider 162. Responsive to this request, in block 434, service provider 162 sends the page.

In block 622, PAE 400-3 determines whether an authentication request is included with the page, and whether PAE 400-3 includes the necessary data, such as in account database 410.

If there is no authentication request, then PAE 400-3 need not take any additional action.

In block 630, if there is an authentication request, then PAE 400-3 may modify the page, for example by adding JavaScript as described in FIG. 4 and elsewhere in this Specification.

In block 636, PAE 400-3 sends the modified page without any authentication request.

In block 464, the JavaScript inserted in block 630 detects a login action and provides a JavaScript request 610. This request is provided to PAE 400-3.

In block 640, PAE 400-3 appends an authentication header to the modified page. PAE 400-3 then performs authentication in block 620 with service provider 162.

In block 680, optional multiple requests may also be handled.

In block 650, user 120 is logged into service provider 162. Thus, service provider 162 may provide a user logged in signal to PAE 400-3. In block 690, PAE 400-3 may also provide to end-user device 110 a user logged in signal.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

Example Implementations

There is disclosed in an example 1, a computing apparatus for providing a network gateway, comprising: a first data connection operable to communicatively couple the gateway to a network service; a second data connection operable to communicatively couplet the gateway to a client device; and one or more logic elements comprising an authentication proxy engine operable for: receiving a login request from the client device via the second data connection; and providing authentication data to the network service via the first data connection.

There is disclosed in an example 2, the computing apparatus of example 1, wherein the proxy engine is further operable for: receiving an authentication validation from the network service via the first data connection; and providing the authentication validation to the client device via the second data connection.

There is disclosed in an example 3, the computing apparatus of example 1, wherein the proxy engine is further operable for: receiving a request for a data page from the client device via the second data connection; receiving the data page from the network service via the first data connection; and forwarding the data page to the client device via the second data connection.

There is disclosed in an example 4, the computing apparatus of example 3, wherein the proxy engine is further operable for modifying the data page request by inserting an authentication header into the data page.

There is disclosed in an example 5, the computing apparatus of example 3, wherein the proxy engine is further operable for modifying the data page before forwarding the data page.

There is disclosed in an example 6, the computing apparatus of example 5, wherein modifying the data page comprises inserting instructions for detecting and intercepting a login action.

There is disclosed in an example 7, the computing apparatus of example 5, wherein the data page comprises a username or password field, and wherein modifying the data page comprises inserting a one-time random or pseudo-random token into the username or password field.

There is disclosed in an example 8, the computing apparatus of example 1, wherein the proxy engine is further operable for authenticating the client device via the second data connection.

There is disclosed in an example 9, the computing apparatus of example 8, wherein authenticating the client device comprises receiving biometric authentication data from the client device.

There is disclosed in an example 10, the computing apparatus of example 8, wherein authenticating the client device comprises two-factor authentication.

There is disclosed in an example 11, the computing apparatus of example 1, wherein the proxy engine is further operable for providing a token to the client device via the second data connection, wherein the token is different from the authentication data.

There is disclosed in an example 12, the computing apparatus of example 11, wherein the token comprises a pseudo-username or pseudo-password.

There is disclosed in an example 13, the computing apparatus of example 1, wherein the proxy engine is further operable for providing a learning mode.

There is disclosed in an example 14, one or more computer-readable mediums having stored thereon executable instructions for providing a proxy engine operable for: receiving a login request for a network service from a client device via a second data connection; providing authentication data to the network service via a first data connection; receiving an authentication validation from a network service via a first data connection; and providing the authentication validation to the client device via a second data connection.

There is disclosed in an example 15, the one or more computer-readable mediums of example 14, wherein the proxy engine is further operable for: receiving a request for a data page from the client device via the second data connection; receiving the data page from the network service via the first data connection; and forwarding the data page to the client device via the second data connection.

There is disclosed in an example 16, the one or more computer-readable mediums of example 15, wherein the proxy engine is further operable for modifying the data page comprising inserting an authentication header into the data page.

There is disclosed in an example 17, the one or more computer-readable mediums of example 15, wherein the proxy engine is further operable for modifying the data page before forwarding the data page.

There is disclosed in an example 18, the one or more computer-readable mediums of example 17, wherein modifying the data page comprises inserting instructions for detecting and intercepting a login action.

There is disclosed in an example 19, the one or more computer-readable mediums of example 17, wherein the data page comprises a username or password field, and wherein modifying the data page comprises inserting a one-time random or pseudo-random token into the username or password field.

There is disclosed in an example 20, the one or more computer-readable mediums of example 14, wherein the proxy engine is further operable for authenticating the client device via the second data connection.

There is disclosed in an example 21, the one or more computer-readable mediums of example 20, wherein authenticating the client device comprises receiving biometric authentication data from the client device or two-factor authentication.

There is disclosed in an example 22, the one or more computer-readable mediums of example 14, wherein the proxy engine is further operable for providing a token to the client device via the second data connection, wherein the token is different from the authentication data.

There is disclosed in an example 23, the one or more computer-readable mediums of example 22, wherein the token comprises a pseudo-username or pseudo-password.

There is disclosed in an example 24, a method of providing a proxy engine, comprising: communicatively coupling to a network service via a first data connection; authenticating a client device via a second data connection; receiving a login request from the client device via the second data connection; and providing authentication data to the network service via the first data connection.

There is disclosed in an example 25, the method of example 24, wherein authenticating the client device comprises biometric authentication or two-factor authentication.

There is disclosed in an example 26, a method comprising the performing the instructions disclosed in any of examples 14-23.

There is disclosed in example 27, an apparatus comprising means for performing the method of example 26.

There is disclosed in example 28, the apparatus of claim 27, wherein the apparatus comprises a processor and memory.

There is disclosed in example 29, the apparatus of claim 28, wherein the apparatus further comprises a computer-readable medium having stored thereon software instructions for performing the method of example 26.

What is claimed is:

1. A computing apparatus for providing a network gateway, comprising:
   a hardware platform comprising at least a processor;
   a service database comprising authentication credentials, wherein the authentication credentials are owned by the network gateway and not by an end user;
   a first network interface configured to communicatively couple the gateway to a network service;
   a second network interface configured to communicatively couple the gateway to a client device; and
   one or more logic elements implemented on the hardware platform and comprising an authentication proxy engine configured to:
   intercept via the second network interface a request from the client device to access the network service;
   determine that the intercepted request requires form-based authentication of the client device or a user of the client device;
   receive a data page requiring form-based authentication from the network service;
   inject a script into a modified data page from the network service, the script configured to detect a login action;
   receive the detected login action from the script, the login action including profile login data and authentication for the client device or a user of the client device;
   extract the authentication credentials from the service database, the authentication credentials comprising a password for the user or the client device; and
   provide authentication data to the network service via the first network interface comprising filling in the form-based authentication.

2. The computing apparatus of claim 1, wherein the proxy engine is further configured to:
   receive an authentication validation from the network service via the first network interface; and
   provide the authentication validation to the client device via the second network interface.

3. The computing apparatus of claim 1, wherein the proxy engine is further configured to:
   receive a request for a data page from the client device via the second network interface;
   receive the data page from the network service via the first network interface; and
   forward the data page to the client device via the second network interface.

4. The computing apparatus of claim 3, wherein the proxy engine is further configured to modify the data page request by inserting an authentication header into the data page.

5. The computing apparatus of claim 3, wherein the proxy engine is further configured to modify the data page before forwarding the data page.

6. The computing apparatus of claim 5, wherein modifying the data page comprises inserting instructions for detecting and intercepting a login action.

7. The computing apparatus of claim 5, wherein the data page comprises a username or password field, and wherein modifying the data page comprises inserting a one-time random or pseudo-random token into the username or password field.

8. The computing apparatus of claim 1, wherein the proxy engine is further configured to authenticate the client device via the second network interface.

9. The computing apparatus of claim 8, wherein authenticating the client device comprises receiving biometric authentication data from the client device.

10. The computing apparatus of claim 8, wherein authenticating the client device comprises two-factor authentication.

11. The computing apparatus of claim 1, wherein the proxy engine is further configured to provide a token to the client device via the second network interface, wherein the token is different from the form-based authentication data.

12. The computing apparatus of claim 11, wherein the token comprises a pseudo-username or pseudo-password.

13. The computing apparatus of claim 1, wherein the proxy engine is further configured to provide a learning mode.

14. One or more non-transitory computer-readable mediums having stored thereon executable instructions for providing a proxy engine configured to:
   intercept a request for a network service from a client device to access the network service;
   determine that the intercepted request requires form-based authentication of the client device or a user of the client device;
   receive a data page requiring form-based authentication from the network service;
   inject a script into a modified data page from the network service, the script configured to detect a login action;
   receive the detected login action from the script, the login action including profile login data and authentication for the client device or a user of the client device;
   extract authentication credentials from a service database, the authentication credentials comprising a password for the user or the client device, wherein the authentication credentials are owned by a network gateway and not by an end user;
   provide authentication data to the network service via a first network interface comprising filling in the form-based authentication;
   receive an authentication validation from a network service via a first network interface; and
   provide the authentication validation to the client device via a second network interface.

15. The one or more non-transitory computer-readable mediums of claim 14, wherein the proxy engine is further configured to:
   receive a request for a data page from the client device via the second network interface;
   receive the data page from the network service via the first network interface; and
   forward the data page to the client device via the second network interface.

16. The one or more non-transitory computer-readable mediums of claim 15, wherein the proxy engine is further configured to modify the data page request, comprising inserting an authentication header into the data page.

17. The one or more non-transitory computer-readable mediums of claim 15, wherein the proxy engine is further configured to modify the data page before forwarding the data page.

18. The one or more non-transitory computer-readable mediums of claim 17, wherein modifying the data page comprises inserting instructions for detecting and intercepting a login action.

19. The one or more non-transitory computer-readable mediums of claim 17, wherein the data page comprises a username or password field, and wherein modifying the data page comprises inserting a one-time random or pseudo-random token into the username or password field.

20. The one or more non-transitory computer-readable mediums of claim 14, wherein the proxy engine is further configured to authenticate the client device via the second network interface.

21. The one or more non-transitory computer-readable mediums of claim 20, wherein authenticating the client device comprises receiving biometric authentication data from the client device or two-factor authentication.

22. The one or more non-transitory computer-readable mediums of claim 14, wherein the proxy engine is further configured to provide a token to the client device via the second network interface, wherein the token is different from the form-based authentication data.

23. The one or more non-transitory computer-readable mediums of claim 22, wherein the token comprises a pseudo-username or pseudo-password.

24. A method of providing a proxy engine, comprising:
   communicatively coupling to a network service via a first network interface;
   authenticating a client device via a second network interface;
   receiving a login request from the client device via the second network interface;
   intercepting via the second network interface a request from the client device to access the network service;
   determining that the intercepted request requires form-based authentication of the client device or a user of the client device;
   receiving a data page requiring form-based authentication from the network service;
   injecting a script into a modified data page from the network service, the script configured to detect a login action;

receiving the detected login action from the script, the login action including profile login data and authentication for the client device or a user of the client device;

extracting authentication credentials from a service database, the authentication credentials comprising a password for the user or the client device, wherein the authentication credentials are owned by a network gateway and not by an end user; and providing authentication data to the network service via the first network interface comprising filling in the form-based authentication.

25. The method of claim 24, wherein authenticating the client device comprises biometric authentication or two-factor authentication.

* * * * *